United States Patent
Glugla et al.

(10) Patent No.: US 9,739,251 B2
(45) Date of Patent: *Aug. 22, 2017

(54) SYSTEMS AND METHODS FOR INJECTING GASEOUS FUEL DURING AN EXHAUST STROKE TO REDUCE TURBO LAG

(71) Applicant: Ford Global Technologies, LLC, Dearborn, MI (US)

(72) Inventors: Chris Paul Glugla, Macomb, MI (US); John Hedges, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/088,958

(22) Filed: Apr. 1, 2016

(65) Prior Publication Data

US 2016/0215748 A1    Jul. 28, 2016

Related U.S. Application Data

(63) Continuation of application No. 14/030,916, filed on Sep. 18, 2013, now Pat. No. 9,303,581.

(51) Int. Cl.
*F02M 21/02* (2006.01)
*F02P 5/04* (2006.01)
(Continued)

(52) U.S. Cl.
CPC .......... *F02P 5/045* (2013.01); *F02D 41/0007* (2013.01); *F02D 41/0025* (2013.01); *F02D 41/0027* (2013.01); *F02D 41/30* (2013.01); *F02D 41/3094* (2013.01); *F02D 41/34* (2013.01); *F02P 5/145* (2013.01); *F02P 5/1527* (2013.01); *F02D 41/402* (2013.01);
(Continued)

(58) Field of Classification Search
CPC .......... F02P 5/045; F02P 5/145; F02P 5/1527; F02D 41/3094; F02D 41/0025; F02D 41/0007; F02D 41/34; F02D 41/0027; F02D 41/30; F02D 41/402; F02B 37/00; Y02T 10/44; Y02T 10/46; Y02T 10/144
USPC ....... 123/299, 300, 305, 525, 436, 636, 431, 123/575, 559.1, 564; 60/605.1
See application file for complete search history.

(56) References Cited

U.S. PATENT DOCUMENTS 4,915,086 A    4/1990  Ciliberto et al.
5,333,593 A    8/1994  Morganti et al.
(Continued)

FOREIGN PATENT DOCUMENTS

EP    1211404 A1    6/2002
WO    2013084019 A1   6/2013

*Primary Examiner* — Hai Huynh
(74) *Attorney, Agent, or Firm* — Julia Voutyras; McCoy Russell LLP

(57) ABSTRACT

Methods and systems are provided for injecting and combusting an amount of gaseous fuel during an exhaust stroke of a cylinder combustion event in order to reduce turbo lag and reduce a duration of time required for an exhaust catalyst to light-off during transient events. In one example, when an increase in torque demand is greater than a threshold, a first amount of gaseous fuel may be combusted during a compression stroke of a cylinder combustion event and a second amount of gaseous fuel may be combusted during an exhaust stroke of the combustion event. The second amount may be adjusted based on the increase in torque demand.

20 Claims, 6 Drawing Sheets

(51) Int. Cl.
 *F02D 41/30* (2006.01)
 *F02D 41/34* (2006.01)
 *F02P 5/152* (2006.01)
 *F02D 41/00* (2006.01)
 *F02P 5/145* (2006.01)
 *F02D 41/40* (2006.01)

(52) U.S. Cl.
 CPC .............. *Y02T 10/144* (2013.01); *Y02T 10/44* (2013.01); *Y02T 10/46* (2013.01)

(56) References Cited

U.S. PATENT DOCUMENTS

| | | |
|---|---|---|
| 5,476,084 A | 12/1995 | Morganti et al. |
| 5,735,253 A | 4/1998 | Perotto et al. |
| 5,956,942 A | 9/1999 | Sebastiano et al. |
| 8,191,514 B2 | 6/2012 | Czekala et al. |
| 8,272,207 B2 | 9/2012 | Kurtz |
| 8,275,538 B2 | 9/2012 | Surnilla et al. |
| 8,355,852 B2 | 1/2013 | Grimm et al. |
| 8,355,858 B2 | 1/2013 | Pallett et al. |
| 9,322,355 B2 * | 4/2016 | Pursifull ............. F02D 41/3094 |
| 9,382,863 B2 * | 7/2016 | Glugla .................... F02D 41/30 |
| 2008/0028750 A1 | 2/2008 | Zukouski et al. |
| 2014/0343827 A1 | 11/2014 | Glugla et al. |
| 2015/0005997 A1 | 1/2015 | Martin et al. |
| 2015/0046065 A1 | 2/2015 | Guido et al. |
| 2015/0075487 A1 | 3/2015 | Glugla et al. |

\* cited by examiner

SYSTEMS AND METHODS FOR INJECTING GASEOUS FUEL DURING AN EXHAUST STROKE TO REDUCE TURBO LAG

CROSS REFERENCE TO RELATED APPLICATIONS

The present application is a continuation of U.S. patent application Ser. No. 14/030,916, entitled "SYSTEMS AND METHODS FOR INJECTING GASEOUS FUEL DURING AN EXHAUST STROKE TO REDUCE TURBO LAG," filed on Sep. 18, 2013, the entire contents of which are hereby incorporated by reference for all purposes.

TECHNICAL FIELD

The present application relates to methods and systems for reducing turbo lag in a boosted engine system with a liquefied petroleum gas (LPG) fuel delivery system.

BACKGROUND AND SUMMARY

Turbocharged engines utilize a turbocharger to compress intake air and increase the power output of the engine. A turbocharger may use an exhaust-driven turbine to drive a compressor which compresses intake air. As the speed of the compressor increases, increased boost is provided to the engine. During transient conditions, upon receiving an increased torque demand, there may be a delay in turbocharger response before the turbine and compressor speed is increased to a desired speed to provide the required boost. This delay in turbocharger response, termed turbo lag, may result in a delay in providing the demanded engine power. For example, during vehicle launch conditions, such as when accelerating from idle, minimal exhaust gas flow combined with increased load on the compressor may result in turbo lag. Consequently, when accelerating from idle speed, turbo lag may decrease responsiveness of the vehicle to driver's torque demand, and thus decrease driving control.

One example approach for reducing turbo lag is shown by Pallett et al. in U.S. Pat. No. 8,355,858 B2. Herein, in addition to a first fuel injection, a second fuel injection is performed after combustion, during the same cylinder cycle. The un-combusted fuel from the second fuel injection is delivered into the exhaust upstream of the turbine, thereby providing increased heat to increase turbine speed.

However, inventors herein have identified issues with such an approach. For example, providing un-combusted liquid fuel in the exhaust produces increased soot and particular matter. Additionally, exhaust heat may be lost due to heat transfer in the combustion chamber. As a result, performing the second fuel injection as described by Pallett may result in degraded fuel economy and emissions.

In one example, the above issues may be addressed by an engine method comprising: during an increase in torque demand greater than a threshold, spark igniting a first amount of gaseous fuel during a compression stroke of a cylinder combustion event; and spark igniting a second amount of gaseous fuel during an exhaust stroke of the cylinder combustion event.

As an example, an engine system may be configured with a liquefied petroleum gas (LPG) fuel delivery system and the gaseous fuel (e.g., LPG) may be direct injected into the combustion chamber. Based on engine operating conditions, such as if a torque demand increase is greater than a threshold, a second fuel injection with spark ignition may be performed to reduce the time required to increase turbine speed to a desired speed. Specifically, a first lean intake stroke injection may be performed, followed by spark ignition during a compression stroke of a cylinder combustion event. Subsequently, during the same cylinder combustion event, a second fuel injection may be performed during an exhaust stroke of the cylinder combustion event. The second fuel injection may be adjusted to maintain an overall air-fuel ratio at stoichiometry or slightly rich. Further, the post-injected fuel (that is, the fuel injected during the exhaust stroke) may be combusted by spark ignition during the exhaust stroke.

In this way, additional exhaust energy may be produced by spark igniting the post fuel injection. The additional exhaust energy may then be utilized to increase turbine speed to a desired speed. Upon achieving a desired turbine speed and/or manifold absolute pressure (MAP), the engine may be operated without the second fuel injection.

In this way, additionally injecting and igniting fuel during the exhaust stroke of a cylinder combustion event may reduce the duration to accelerate the turbocharger to a desired speed and provide the desired boost. As a result, turbo lag may be reduced while also reducing a loss of heat to the combustion chamber and particulate matter formation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
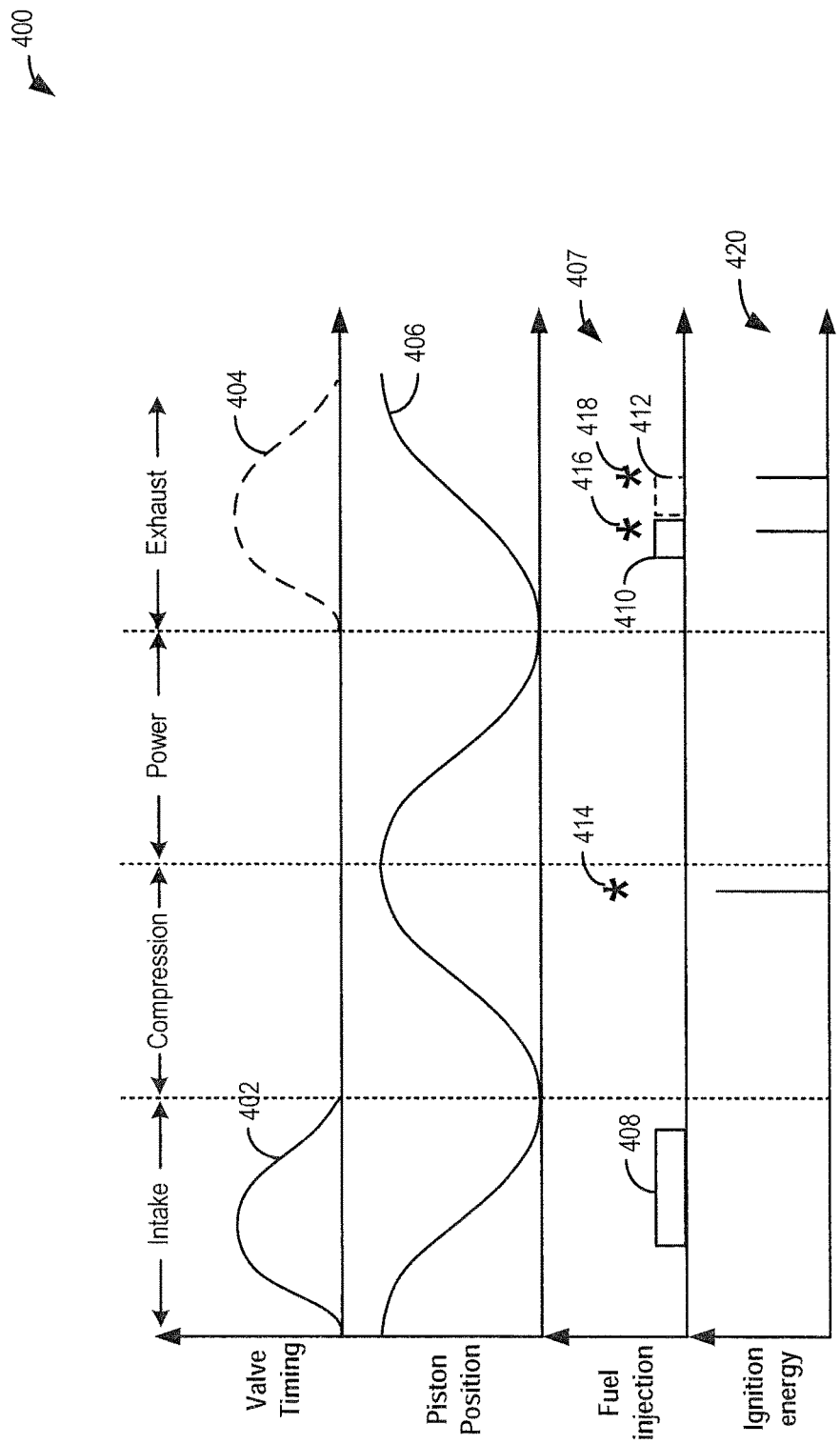
FIG. 4 shows example injection timings and spark timings for second fuel injection events.
Figure 5:
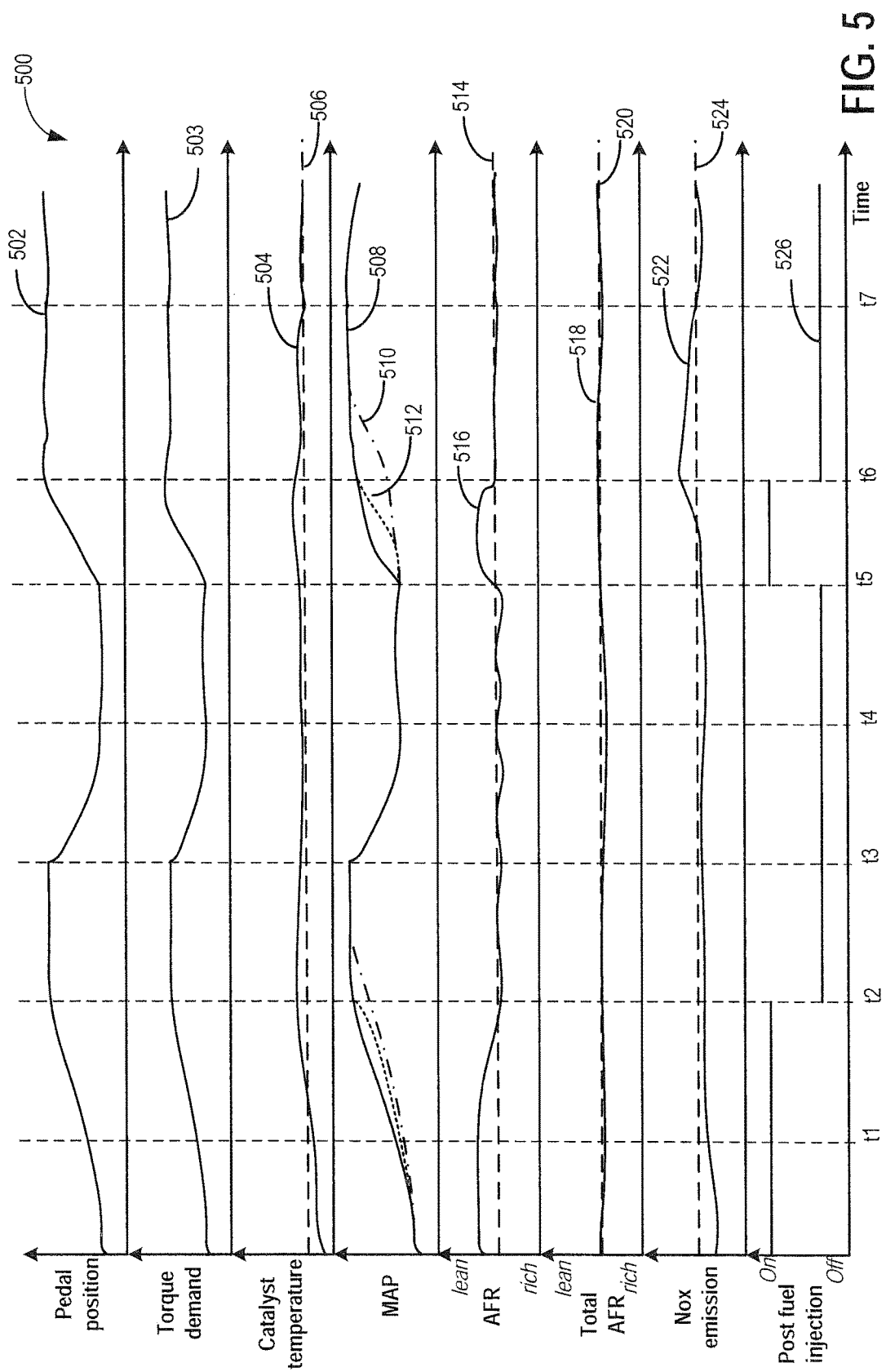
FIG. 5 depicts example second fuel injection operation used during cold start and acceleration from steady-state un-boosted conditions.

The present description relates to an engine system configured to deliver gaseous fuel. In one non-limiting example, the engine may be configured as part of the system illustrated in FIG. 1, wherein the engine includes at least one cylinder, a control system, and a turbocharger among other features. Turbocharged engines may experience turbo lag (that is, a delay before a turbine speed increases to a threshold speed to provide demanded torque output). A method for reducing turbo lag (shown at FIG. 2A) includes combusting a first fuel amount during a compression stroke of a cylinder combustion event, and subsequently combusting a second fuel amount during an exhaust stroke. Injecting and combusting a second amount of a fuel during an exhaust stroke may be referred to as post fuel injection. Post fuel injection and combustion may be adjusted based on engine operating conditions, including torque demand, as described at FIG. 3. When post fuel injections are not performed, the engine may operate by injecting and combustion fuel during the compression stroke and not the exhaust stroke, as depicted at FIG. 2B. Examples of post fuel injection timings and post fuel injection events are shown at FIGS. 4 and 5 respectively.

Figure 1:
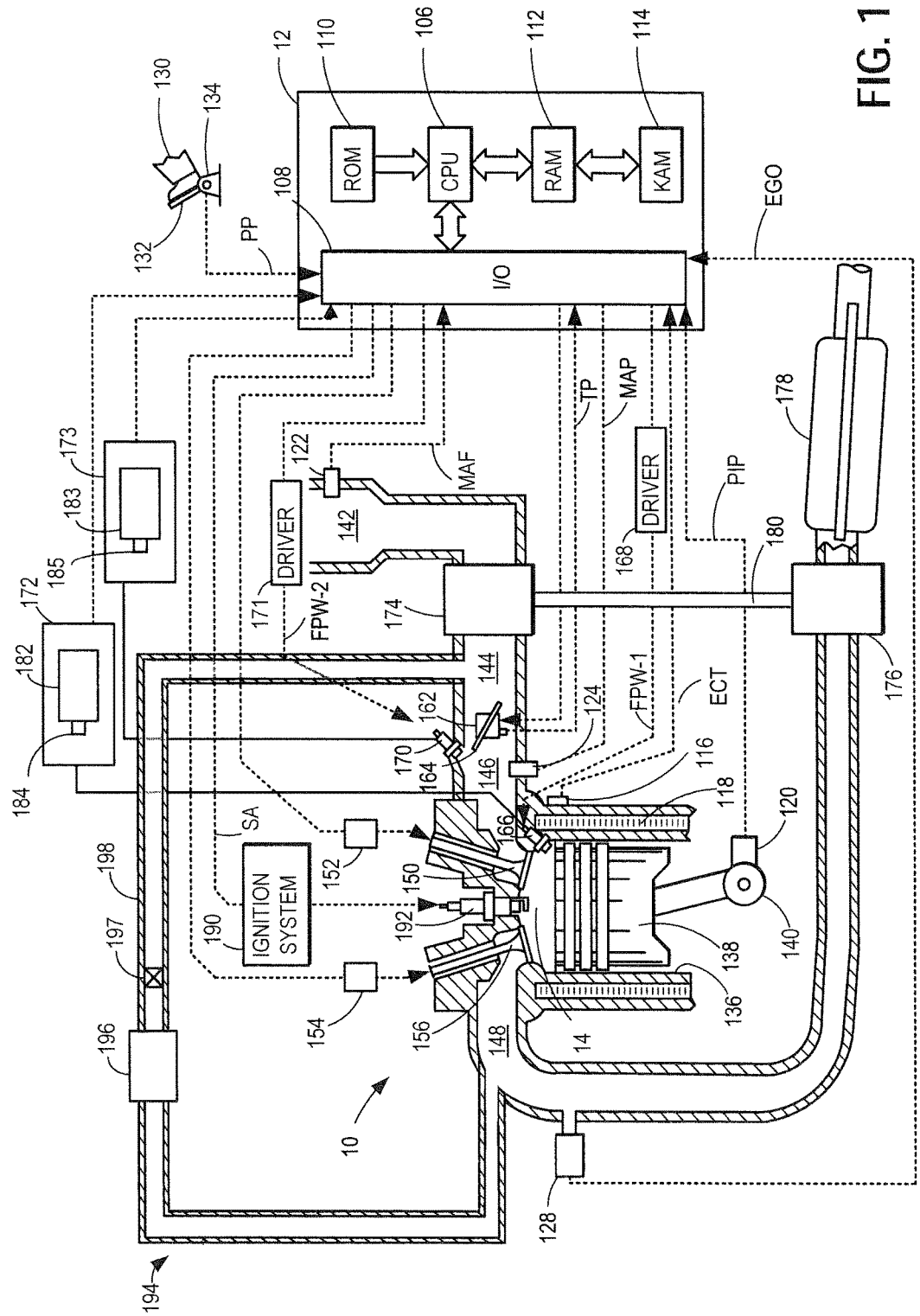
FIG. 1 shows a schematic depiction of a multi-fuel engine system configured to operate with a liquid fuel and a gaseous fuel.

Referring to FIG. 1, it depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (that is, combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. A throttle 162 including a throttle plate 164 may be provided along an intake passage of the engine for varying the flow rate and/or pressure of intake air provided to the engine cylinders. Further, intake passage 144 may include a throttle inlet pressure (TIP) sensor (not shown) upstream of throttle 162 for estimating a throttle inlet pressure (TIP). Throttle 162 may be disposed downstream of compressor 174 as shown in FIG. 1, or may be alternatively provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof. Further, the emission control device 78 may comprise a temperature sensor (not shown) to provide an indication of temperature of the exhaust catalyst. Engine 10 may include an exhaust gas recirculation (EGR) system indicated generally at 194. EGR system 194 may include an EGR cooler 196 disposed along the EGR conduit 198. Further, the EGR system may include an EGR valve 197 disposed along EGR conduit 198 to regulate the amount of exhaust gas recirculated to the intake manifold 144.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing timing and/or lift amount of the respective intake and exhaust valves. The position of intake valve 150 and exhaust valve 156 may be determined by respective valve position sensors (not shown). The valve actuators may include electric valve actuation or cam actuation, or a combination thereof. In the example of cam actuation, each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

During engine operation, each cylinder within engine 10 typically undergoes a cylinder combustion event comprising a four stroke cycle: the cycle includes the intake stroke, compression stroke, expansion stroke, and exhaust stroke. During the intake stroke, generally, the exhaust valve 156 closes and intake valve 150 opens. Air is introduced into combustion chamber 30 via intake manifold 146, and piston 138 moves to the bottom of the cylinder so as to increase the volume within combustion chamber 14. The position at which piston 138 is near the bottom of the cylinder and at the end of its stroke (e.g. when combustion chamber 14 is at its largest volume) is typically referred to by those of skill in the art as bottom dead center (BDC). During the compression stroke, intake valve 150 and exhaust valve 156 are closed. Piston 138 moves toward the cylinder head so as to compress the air within combustion chamber 14. The point at which piston 138 is at the end of its stroke and closest to the cylinder head (e.g. when combustion chamber 14 is at its smallest volume) is typically referred to by those of skill in the art as top dead center (TDC). In a process hereinafter referred to as injection, fuel is introduced into the combustion chamber during intake stroke of the cylinder combustion event. In a process hereinafter referred to as ignition, the injected fuel is ignited during compression stroke by known ignition means such as spark plug 192, resulting in combustion. During the expansion stroke, the expanding gases push piston 138 back to BDC. Crankshaft 140 converts piston movement into a rotational torque of the rotary shaft. Finally, during the exhaust stroke, the exhaust valve 156 opens to release the combusted air-fuel mixture to exhaust manifold 148 and the piston returns to TDC. In this way, a single cylinder combustion event may include an intake stroke, a compression stroke, an expansion stroke, and an exhaust stroke. Note that the above is shown merely as an example, and that intake and exhaust valve opening and/or closing timings may vary, such as to provide positive or negative valve overlap, late intake valve closing, or various other examples.

In some examples, engine 10 may be operated with post fuel injection. Specifically, in addition to the fuel injection during the intake stroke, as discussed above, fuel may also be injected and combusted (via ignition) during the exhaust stroke. The injecting a second amount fuel during the exhaust stroke may be referred to as post fuel injection. Thus, operating the engine 10 with post fuel injection may include combusting a first amount of fuel during the compression stroke and combusting a second amount of fuel during the exhaust stroke of the same cylinder combustion event. Details of operating the engine 10 with post fuel injection will be further elaborated at FIGS. 2-5.

Each cylinder of engine 10 may include a spark plug 192 for igniting injected fuel and initiating combustion. Ignition system 190 can provide an ignition spark to combustion chamber 14 via spark plug 192 in response to a spark advance signal SA from controller 12, under select operating modes. The ignition system includes an ignition coil (not shown) comprising a primary coil and a secondary coil. Current flowing through the primary coil is utilized to create a magnetic field around the secondary coil. When spark is required, current flow through the primary coil is stopped causing the magnetic field around the secondary coil to collapse. The change in magnetic field induces current flow though the secondary coil. As such, the secondary coil may contain of a larger number of turns of wire than the primary coil. As a result, upon induction, the secondary coil generates high voltage which may be delivered to the spark plug 192 to generate spark for ignition. In this way, the ignition coil provides an increase in voltage to the spark plug 192 for ignition. As such, an ignition energy of the ignition spark may be adjusted by adjusting an ignition coil dwell time. Ignition coil dwell time is the duration of current flow through the primary coil. Therefore, increasing the ignition coil dwell time (may be referred to herein as dwell time) increases the ignition energy of the spark, and decreasing the ignition coil dwell time decreases the ignition energy of the spark, for example. In other examples, adjusting an ignition coil strike frequency may also adjust the ignition energy of the spark delivered by the spark plug 192. For example, decreasing the strike frequency of the ignition coil may decrease a number of sparks output by the spark plug. As a result, the ignition energy for combustion may be reduced.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Fuel may be delivered to fuel injector 166 by a first fuel system 172, which may be a high pressure fuel system, including a fuel tank, a fuel pump, and a fuel rail. In one example as shown in FIG. 1, the fuel system 172 may include a pressurized gas fuel tank 182, and a fuel pressure sensor 184 to detect the fuel pressure in the fuel tank 182.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 from second fuel system 173, which may be a liquid (e.g., gasoline, ethanol, or combinations thereof) fuel system, including a fuel tank, fuel pumps, and a fuel rail. In one example as shown in FIG. 1, fuel system 173 may include a fuel tank 183 and a fuel sensor 185, for example a liquid level sensor, to detect the storage amount in the fuel tank 182. Alternatively, fuel may be delivered by a single stage fuel pump at lower pressure, in which case the timing of the direct fuel injection may be more limited during the compression stroke than if a high pressure fuel system is used. In an alternate embodiment, fuel from the second fuel system may additionally or alternatively be delivered to an additional direct fuel injector for injecting fuel directly into the combustion chamber 14.

Note that a single driver 168 or 171 may be used for both fuel injection systems, or multiple drivers, for example driver 168 for fuel injector 166 and driver 171 for fuel injector 170, may be used, as depicted. The fuel system 172 may be a gaseous fuel system. In one example, the gaseous fuel may be stored in a liquid fuel tank as liquefied petroleum gas (LPG). In another example, the gaseous fuel may include CNG, hydrogen, LPG, LNG, etc. or combinations thereof. It will be appreciated that gaseous fuels, as referred to herein, are fuels that are gaseous at atmospheric conditions but may be in liquid form while at high pressure (specifically, above saturation pressure) in the fuel system. In comparison, liquid fuels, as referred to herein, are fuels that are liquid at atmospheric conditions. While FIG. 1 depicts a dual fuel system, in some examples, a single gaseous fuel system may be used to deliver gaseous fuel such as CNG, hydrogen, LPG, LNG, etc. or combinations thereof to the combustion chamber by direct injection.

It will be appreciated that while the depicted embodiment is configured to deliver one fuel via direct injection and another fuel via port injection, in still further embodiments, the engine system may include multiple port injectors wherein each of the gaseous fuel and the liquid fuel is delivered to a cylinder via port injection. Likewise, in other embodiments, the engine system may include multiple direct injectors wherein each of the gaseous fuel and the liquid fuel is delivered to a cylinder via direct injection.

The delivery of the different fuels may be referred to as a fuel type, such that the fuel type may be varied by injection relatively more or less of the liquid fuel compared with the gaseous fuel, or vice versa.

As introduced above, during certain engine operating conditions, turbo lag may occur. For example, due to an increase in torque demand greater than a threshold demand, turbo lag may occur. Increase in torque demand may be determined based on an increase in acceleration greater than a threshold acceleration. In one example, turbo lag may occur during acceleration from an idle condition. In another example, turbo lag may occur during acceleration from steady-state un-boosted conditions.

In one example, the direct injection (DI) gaseous fuel system 172 may be configured to deliver one or more post fuel injections during transient conditions to reduce turbo lag and/or improve catalyst light-off. Post fuel injection may include injecting and igniting a second amount of fuel (in addition to injecting a first amount of fuel during intake stroke and combusting the first amount of fuel during compression stroke) during an exhaust stroke of a cylinder combustion event. Combustion of post fuel injections may be initiated by the ignition system 190.

By performing post fuel injection, additional exhaust energy (obtained by combustion of the second fuel amount) may be partly utilized to reduce the duration to bring the turbine to a threshold speed, thereby reducing turbo lag. Further details on utilizing post fuel injection for reducing turbo lag are discussed below with reference to FIGS. 2-5. Additionally, in some examples, when post fuel injection is performed during cold start conditions, the additional exhaust energy may be partly utilized to reduce the duration to bring a temperature of emission control device 178 (e.g., temperature of an exhaust three way catalyst or exhaust catalyst) to a threshold temperature, thereby improving catalyst light-off.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal, MAP, from MAP sensor 124. Engine speed signal, RPM, may be generated by controller 12 from signal PIP. Further, the controller may receive a turbine speed signal (not shown) from a turbine speed sensor (not shown) located at the turbine 176. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 120, which is also used as an engine speed sensor, may produce a predetermined number of equally spaced pulses every revolution of the crankshaft. Additionally, a spark timing, that is, a point of time during the cylinder combustion event when the spark plug fires in the cylinder to initiate combustion, may be adjusted by the controller.

As described above, FIG. 1 shows only one cylinder of a multi-cylinder engine. As such, each cylinder may similarly include its own set of intake/exhaust valves, fuel injector(s), spark plug, etc.

The system of FIG. 1 provides for a system for an engine comprising an engine cylinder, a fuel injector coupled to the engine cylinder, a spark plug coupled to the engine cylinder, the spark plug including an ignition coil, a controller with computer-readable instructions for injecting liquefied petroleum gas (LPG) into the engine cylinder with the fuel injection during an exhaust stroke of a cylinder combustion event and burning the injected LPG by striking the ignition coil one or more times during the exhaust stroke. The computer-readable instructions further include instructions for adjusting one or more spark ignition parameters to adjust an ignition energy of the spark. In one example, the one or more spark ignition parameters includes an ignition coil dwell time, a current level of the ignition coil, and a strike rate of the ignition coil.

Figure 2A:
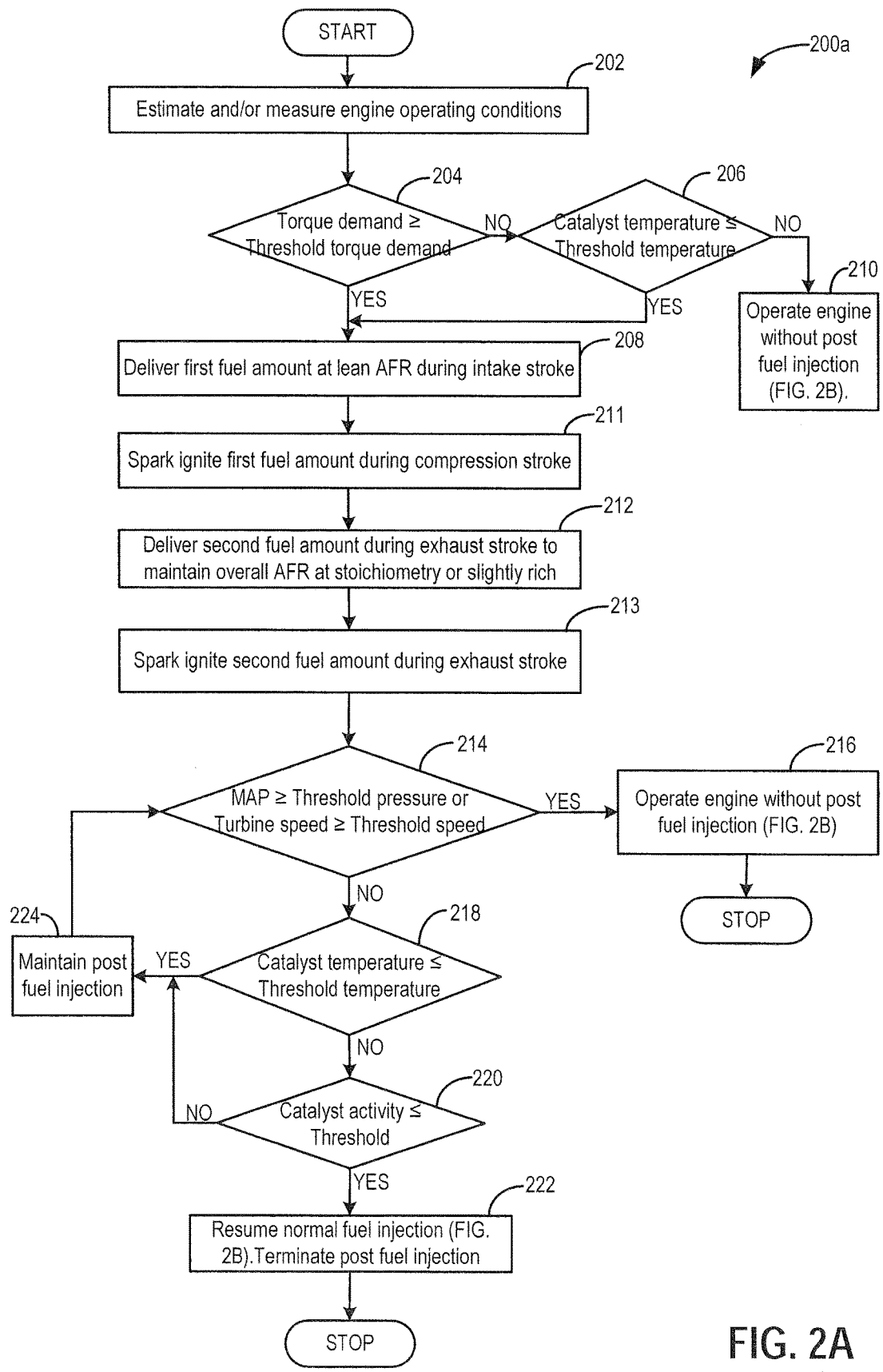
FIG. 2A shows a flowchart depicting an example method for performing a second fuel injection during transient operations.
Figure 2B:
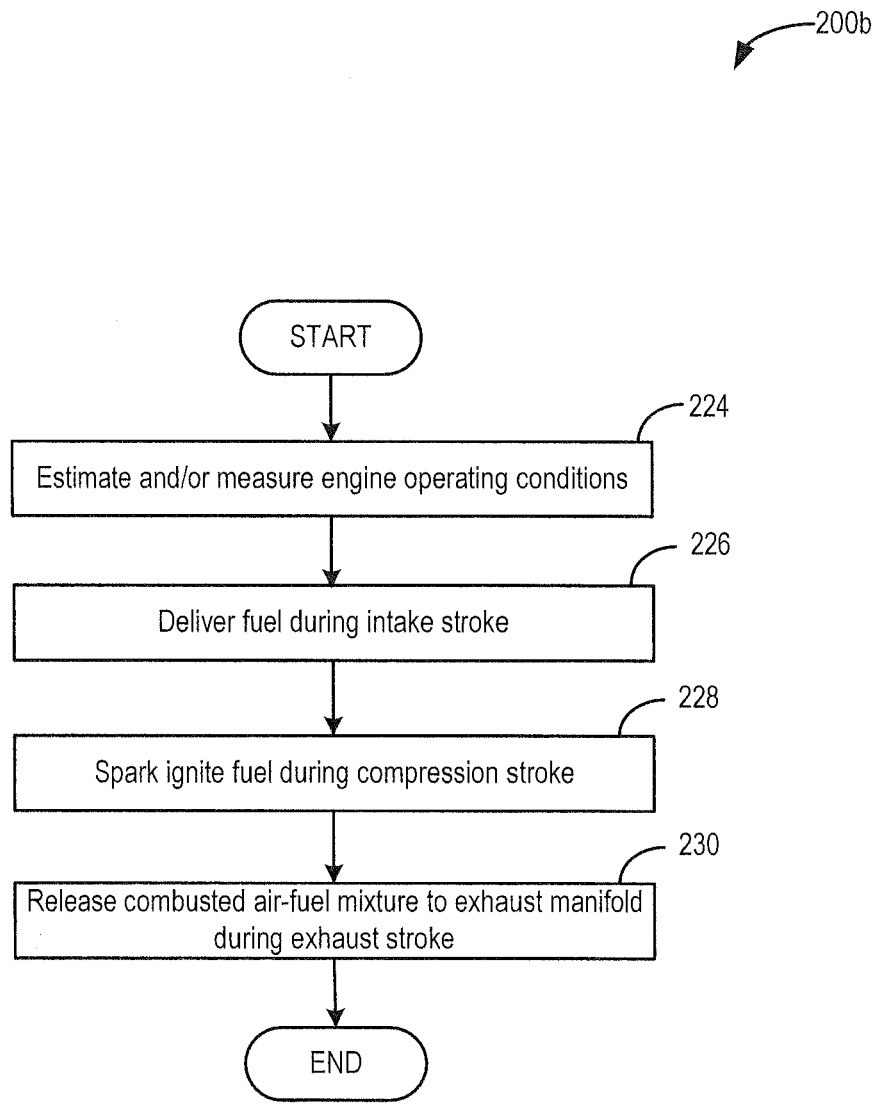
FIG. 2B shows a flowchart depicting an example method for operating an engine without a second fuel injection.

Turning to FIG. 2, it shows example methods for performing fuel injection during a cylinder combustion event. Specifically, FIG. 2A shows a routine 200*a* for performing post fuel injection to reduce turbo lag and improve catalyst light-off. FIG. 2B shows a routine 200*b* for performing fuel injection without post fuel injection. For example, post fuel injection may be performed during one or more transient engine operations such as acceleration from steady-state cruise or idle conditions, and cold start conditions. In one example, a controller, such as controller 12 shown in FIG. 1, may execute routine 200*a* and routine 200*b* based on instructions stored thereon. At 202, the controller may estimate and/or measure engine operating conditions. Engine operating conditions may include but are not limited to engine speed and load, mass air flow, throttle position, boost pressure, manifold absolute pressure, manifold temperature, engine coolant temperature, barometric pressure, exhaust catalyst temperature, pedal position, etc.

Next, at 204, based on engine operating conditions, the controller may determine if an increase in torque demand is greater than a threshold torque demand. The threshold torque demand may be based on an increase in required boost. In some cases, the increase in the required boost may result in a delay in the delivery of required boost for the torque demand to the engine (e.g., turbo lag). Thus, the threshold torque demand may be based on an increase in torque demand that may result in a delay in the output of the demanded torque. Further, the threshold torque demand may be non-zero, and the threshold torque demand may increase with increasing engine speed at which the torque demand is generated. For example, during acceleration from un-boosted, steady-state cruise conditions or idle conditions, there may be a sudden increase in torque demand from a vehicle operator. Additionally, increase in torque demand may be experienced during cold start conditions. Torque demand may be determined based on rate of change of accelerator pedal position, or rate of change of throttle position. For example, during acceleration from un-boosted steady-state, or idle conditions, there may be rapid depression of the accelerator pedal by the vehicle operator. In other words, there may be tip-in of the accelerator pedal from un-boosted steady-state, or idle conditions. As a result, an opening of the intake throttle may increase to allow more air into the intake manifold. Consequently, an increase in rate of change of accelerator pedal position and/or throttle position may indicate an increase in torque demand. In some examples, if there is a tip-in, the method may continue on to 208-213 to operate the engine with post fuel injection, as described further below.

At 204, if the torque demand is not greater than the threshold torque demand, at 206, the controller may determine if an exhaust catalyst temperature is less than a threshold temperature. For example, the threshold temperature may be based on an operating temperature at which the exhaust catalyst reduces exhaust emissions to a level below a threshold level. During cold-start conditions, the catalyst may not be at the operating temperature. It may take a duration of time after the cold-start for the engine to warm up and bring the catalyst to the threshold temperature. During the warm up period, since the catalyst is not operating at its optimal temperature, there may be increased emissions (e.g., such as NOx or particulate matter) from the exhaust. In order to reduce the time required to achieve catalyst threshold temperature, post fuel injection may be performed. Therefore, at 206, if it is determined that the catalyst temperature is less than the operating temperature, the routine may proceed to 208, 211, and subsequently to 212 to perform post fuel injection as discussed further below.

In this way, when post fuel injection is performed during conditions when catalyst temperature is less than its optimal operating temperature, such as during cold start conditions, for example, the additional heat from the exhaust gas may be partially utilized to warm-up the exhaust catalyst to its operating temperature faster than when post fuel injection is not performed. As a result, decreased exhaust emissions may be achieved during cold-start conditions.

If at 206, the catalyst temperature is not less than the threshold temperature, engine operation may continue without post fuel injection at 210, as elaborated further at FIG. 2B.

Returning to 204, if torque demand is greater than or equal to a threshold torque demand, the routine may proceed to 208. At 208, the routine includes delivering a first fuel amount to the combustion chamber during an intake stroke of a cylinder combustion event (e.g., cylinder cycle). The first fuel amount may be delivered during a first injection, and may be based on a gaseous fuel amount producing a lean air-fuel ratio. Additionally, the first fuel amount producing the lean air-fuel ratio may be adjusted based on torque demand and potential loss of torque. For example, during the initial stages of a tip-in from idle or un-boosted steady-state conditions, the first amount may be adjusted to produce a less lean air-fuel ratio to reduce torque loss resulting from combusting a second amount of fuel during the exhaust stroke, the second amount of fuel compensating for the lean air-fuel ratio. During later stages of the tip-in, as more torque is generated, the first amount may be adjusted to produce a more lean air-fuel ratio. As a result, the second amount of fuel injected during the exhaust stroke may increase to compensate for the leaner air-fuel ratio and produce an overall stoichiometric or slightly rich air-fuel ratio. Adjusting the second amount of fuel is discussed further below at 212. The adjustment of the first fuel amount may be performed until a turbine speed exceeds a threshold turbine speed, or until a manifold pressure exceeds a threshold pressure, the threshold speed, and the threshold pressure based on the torque demand. In some examples, the first fuel amount may be adjusted until a throttle inlet pressure (TIP) exceeds a threshold throttle inlet pressure, the threshold throttle inlet pressure based on the torque demand. In alternate embodiments, the first fuel amount may be based on a gaseous fuel amount producing a stoichiometric air-fuel ratio. The injected fuel may be a gaseous fuel such as LPG and the fuel may be injected directly into the combustion chamber by a direct-injection (DI) system, as described at FIG. 1. For example, a direct fuel injector, such as fuel injector 166 shown in FIG. 1, may inject a first amount of LPG into the engine cylinder (e.g., combustion chamber) during the intake stroke of the cylinder combustion event. Subsequently, at 211, the first amount of injected fuel may be combusted by spark ignition during a compression stroke of the cylinder cycle. For example, the routine at 211 may include spark igniting the first amount of fuel with a spark plug, such as the spark plug 192 shown in FIG. 1.

Next, at 212, following combustion of the first fuel amount, post fuel injection may be performed during the exhaust stroke of the cylinder combustion event. During post fuel injection, a second fuel amount may be delivered to the combustion chamber through the DI system. That is, the second fuel amount may be delivered during a second fuel injection, the second fuel injection performed separately from the first fuel injection. In one example, the second fuel amount may be smaller than the first fuel amount.

Due to lean operation during the first fuel injection, the second fuel amount may be adjusted such that residual oxygen after the first fuel combustion may be consumed during combustion of the second fuel amount. As such, the overall air-fuel ratio of the cylinder combustion event may be maintained at stoichiometry or slightly rich. The second amount of fuel may be further based on a turbine speed relative to a threshold turbine speed. In one example, the threshold turbine speed may be based on the torque demand. Specifically, the threshold turbine speed may be the turbine speed that produces the required boost for the torque demand. As such, as the torque demand increases, the threshold turbine speed increases. As the difference between the turbine speed and the threshold turbine speed increases, a larger amount of fuel may be required for the second injection event at 212. In another example, the second amount of fuel may be based on a manifold pressure relative to a MAP threshold, the MAP threshold based on the torque demand. Specifically, the threshold MAP may be the minimum MAP required to provide a desired boost for the torque demand. As the torque demand increases, the threshold MAP increases. Further, as the difference between the MAP and the threshold MAP increases, the second fuel injection amount during post fuel injection increases. In still another example, the second amount of fuel may be based on TIP relative to the TIP threshold, and as the difference between the TIP and the threshold TIP increases, the second fuel injection amount during post fuel injection increases. The threshold turbine speed, the threshold MAP, and the threshold TIP may be based on vehicle acceleration.

Further, in still another example, the second amount of fuel delivered and combusted during the exhaust stroke may be based on the temperature of the exhaust catalyst. For example, a larger amount of fuel may be injected during the exhaust stroke if the temperature of the exhaust catalyst is a greater amount below the threshold temperature than if the temperature of the exhaust catalyst were a smaller amount below the threshold temperature.

Subsequently, at 213, the second fuel amount injected may be combusted by spark ignition during the exhaust stroke. For example, the routine at 213 may include spark igniting the second amount of fuel with a spark plug, such as the spark plug 192 shown in FIG. 1. By performing post fuel injection, and combusting the fuel, increased exhaust gas may be generated, which may be partly utilized to spin the turbine and bring the turbine speed to a desired speed in a shorter duration than when post fuel injection is not performed. As a result, turbo lag may be reduced. In some embodiments, the method at 213 may including adjusting one or more spark parameters in order to adjust an ignition energy used to ignite the second amount of fuel. For example, the second amount of fuel may be spark ignited at 213 at a lower ignition energy than when spark igniting the first amount at 211, the ignition energy based on cylinder load conditions. Further details on adjusting ignition energy are discussed below with reference to FIG. 3.

After combusting the post fuel injection, at 214 the method may include determining if a manifold pressure (MAP) (e.g., such as a manifold pressure measured by a MAP sensor at the intake manifold) is greater than or equal to a threshold MAP. For example, the threshold MAP may be based on torque demand. Specifically, the threshold MAP may be a MAP which produces the demanded torque. Additionally or alternatively, at 214, the controller may determine if a turbine speed is greater than or equal to a threshold speed. In one example, the turbine speed may be monitored by a turbine speed sensor. For example, the threshold turbine speed may be based on torque demand. Specifically, the threshold turbine speed may be the turbine speed which produces the demanded torque. As such, the threshold MAP and the threshold turbine speed may increase with an increase in torque demand. If, at 214, either of the MAP or turbine speed conditions are satisfied, that is, if MAP has reached or exceeded the threshold pressure or if turbine speed has reached or exceeded the threshold speed, the routine may proceed to 216. At 216, the controller may stop post fuel injection. In other words, injection of the second fuel amount and spark ignition of the second fuel amount may be stopped and the engine operation may resume without the post fuel injection, which will be further elaborated at FIG. 2B. In one example, post fuel injection may be stopped when the TIP reaches or exceeds the threshold TIP.

If MAP and/or turbine speed has not reached or exceeded the respective thresholds, the routine may proceed to 218 to determine if exhaust catalyst temperature is less than the threshold temperature. If the exhaust catalyst temperature is less than the threshold temperature, engine operation may continue with post fuel injection at 224. In one example, the post fuel injection may include spark igniting the first amount and the second amount for a number of combustion events, the number of combustion events based on one or more of turbine speed, a manifold pressure, and catalyst temperature. For example, if the turbine speed, manifold pressure, and/or catalyst temperature are below their respective thresholds are below their respective thresholds by a greater amount, post fuel injection may continue for a greater number of cylinder combustion events than if they were below their respective thresholds by a smaller amount.

If catalyst temperature has reached or exceeded the threshold temperature, next at 220, the method may include determining if a catalyst activity is less than a threshold level. If the catalyst activity is less than a threshold level, post fuel injection may be stopped. For example, the threshold level may be based on a level of NOx emission. In one example, the exhaust catalyst may be oxidized decreasing its ability to reduce NOx. Consequently, NOx emission levels may increase. In another example, catalyst efficiency degradation may be based on modeled oxygen storage and monitoring of a downstream (after catalyst) oxygen sensor. Therefore, upon determining reduced catalytic activity, post fuel injection may be terminated to prevent further oxidation of the exhaust catalyst.

If at 220, it is determined that catalyst activity is not below the threshold level, engine operation may continue with post fuel injection. In this way, post fuel injection may be performed when the increase in torque demand exceeds a threshold by combusting first and second fuel amounts for one or more combustion events/cycles until a desired turbine speed, MAP pressure, or TIP pressure is reached to reduce turbo lag. In one example, fuel may be injected into the cylinder during the exhaust stroke when a turbine speed is a threshold amount below a threshold turbine speed, the threshold turbine speed based on a torque demand. However, catalyst activity may be monitored during post fuel injection, and upon detection of degraded catalytic activity, post fuel injection may be stopped. Additionally, post fuel injection may be performed when the catalyst temperature is less than a threshold temperature to reduce the duration of catalyst warm-up period to the threshold temperature.

In one example, a gaseous fuel may be injected into the cylinder during the exhaust stroke. The gaseous fuel may be stored in a liquid fuel tank as liquefied petroleum gas (LPG). Alternatively, the gaseous fuel may include CNG, hydrogen, LPG, LNG, etc. or combinations thereof. In this way, a method for performing post fuel injection may include, during an increase in torque demand greater than a threshold, spark igniting a first amount of gaseous fuel during a compression stroke of a cylinder combustion event; and spark igniting a second amount of gaseous fuel during an exhaust stroke of the cylinder combustion event, the second amount being smaller than the first amount. The increase in torque demand may be indicated by an increase in pedal position, and the threshold may be based on an increase in required boost. In one example, the gaseous fuel utilized for post fuel injection is stored in a liquid fuel tank as liquefied petroleum gas (LPG).

During post fuel injection, the first amount may be based on a gaseous fuel amount producing a lean air-fuel ratio, and the second amount may be based on the lean air-fuel ratio and one or more of a turbine speed relative to a threshold turbine speed, a manifold pressure relative to a threshold manifold pressure, or a throttle inlet pressure relative to a threshold throttle inlet pressure. Further, post fuel injection may include spark igniting the second amount at a lower ignition energy than the first amount, and adjusting the ignition energy of the second amount by adjusting one or more of a dwell time, a current, a strike rate, and timing of a spark plug. Still further, post fuel injection may include continuing spark igniting the first amount and the second amount for a number of combustion events, the number of combustion events based on one or more of turbine speed relative to a threshold turbine speed and a manifold pressure relative to a threshold manifold pressure, the threshold turbine speed and the threshold manifold pressure based on the increase in the torque demand.

Post fuel injection may be terminated by stopping injecting and spark igniting the second amount of gaseous fuel when the turbine speed increases above a threshold turbine speed, the threshold turbine speed based on a torque demand and/or when the manifold pressure increases above a threshold manifold pressure. In another example, post fuel injection may be terminated by stopping injecting and spark igniting the second amount of gaseous fuel when the throttle inlet pressure increases above the threshold throttle inlet pressure. In another example, post fuel injection may be terminated by stopping injecting and spark igniting the second amount of gaseous fuel when catalytic activity of an exhaust catalyst decreases below a threshold level. In one example, post fuel injection may be performed during acceleration from idle or steady-state cruise conditions. In another example, post fuel injection may be when the engine load increases greater than a threshold, such during an uphill climb. In still another example, post fuel injections may be performed during cold start conditions to reduce turbo lag, and to reduce the time required for the catalyst to reach its operational temperature.

Further, in another example, post fuel injections with gaseous fuel as discussed above may be performed during positive valve overlap conditions when blow-through air is provided. For example, in a turbocharged engine system, when a torque demand exceeds a threshold torque demand, boosted intake air may be driven from the intake manifold downstream of the compressor into the exhaust manifold, upstream of the turbine. Blow-through may be provided by temporarily adjusting a variable cam timing to provide positive valve overlap. During the positive overlap period, the boosted air inducted through the cylinders may provide additional mass flow and enthalpy in the exhaust, thereby enabling the turbine to spin faster to meet the torque demand. Performing post fuel injections during blow-through conditions may further provide extra exhaust energy to reduce turbo-lag.

When post fuel injections are performed during blow-through conditions, amount of post fuel injection may be adjusted such that the overall air-fuel ratio is rich. For example, the amount of post-fuel injection during blow-through conditions may be based on a duration of positive valve overlap. As the duration of valve overlap increases, more air may be utilized for blow-through. Consequently, more fuel may be injected during post fuel injection to provide sufficient fuel for combustion of the post fuel injection amount, and reduce the amount of air reaching the exhaust catalyst. In this way, performing post fuel injection by injecting gaseous fuel during exhaust stroke and spark igniting the post injected fuel when torque demand increases beyond a threshold, may provide additional exhaust energy to increase the turbine speed to a desired speed. Consequently, the time taken for the turbine to reach the desired speed may be reduced. In other words, turbo lag may be reduced. Further, post fuel injection may be utilized to reduce the duration for the catalyst to reach operational temperature, that is, to improve catalyst light-off.

Taken together, post fuel injection may be utilized to reduce turbo lag and reduce time taken for catalyst to light-off. By utilizing gaseous fuel for post fuel injection, production of soot and particulate matter may be reduced. By combusting the post fuel injection amount, heat may not be lost to the cylinder and the additional heat generated by post fuel combustion may be efficiently utilized to reduce turbo lag and improve catalyst light-off.

Turning to FIG. 2B, it shows an example routine 200b for operating an engine without post fuel injection events. For example, when torque demand is not greater than a threshold and/or when an exhaust catalyst is at a threshold temperature, injecting fuel during an exhaust stroke may not be required, as determined at FIG. 2A.

At 224, the controller may estimate and/or measure engine operating conditions. Engine operating conditions may include, but are not limited to, engine speed and load, mass air flow, throttle position, boost pressure, manifold absolute pressure, manifold temperature, engine coolant temperature, barometric pressure, exhaust catalyst temperature, etc.

Upon determining engine operating conditions at 226, the air-fuel mixture may be delivered to the combustion chamber during the intake stroke of the cylinder combustion event (e.g., cylinder cycle). The amount of fuel injected may be determined based on engine operating conditions such as engine speed and load, for example. Additionally, the amount of fuel injected at 226 may be based on a stoichiometric air-fuel ratio. In another example, the amount of fuel injected at 226 may be based on a rich or lean air-fuel ratio. Then, at 228, combustion of fuel in the combustion chamber may be initiated by spark ignition during compression stroke. Finally, at 230, the combusted air-fuel mixture may be released into the exhaust manifold during the exhaust stroke. Post fuel injection may not be performed during the exhaust stroke.

Figure 3:
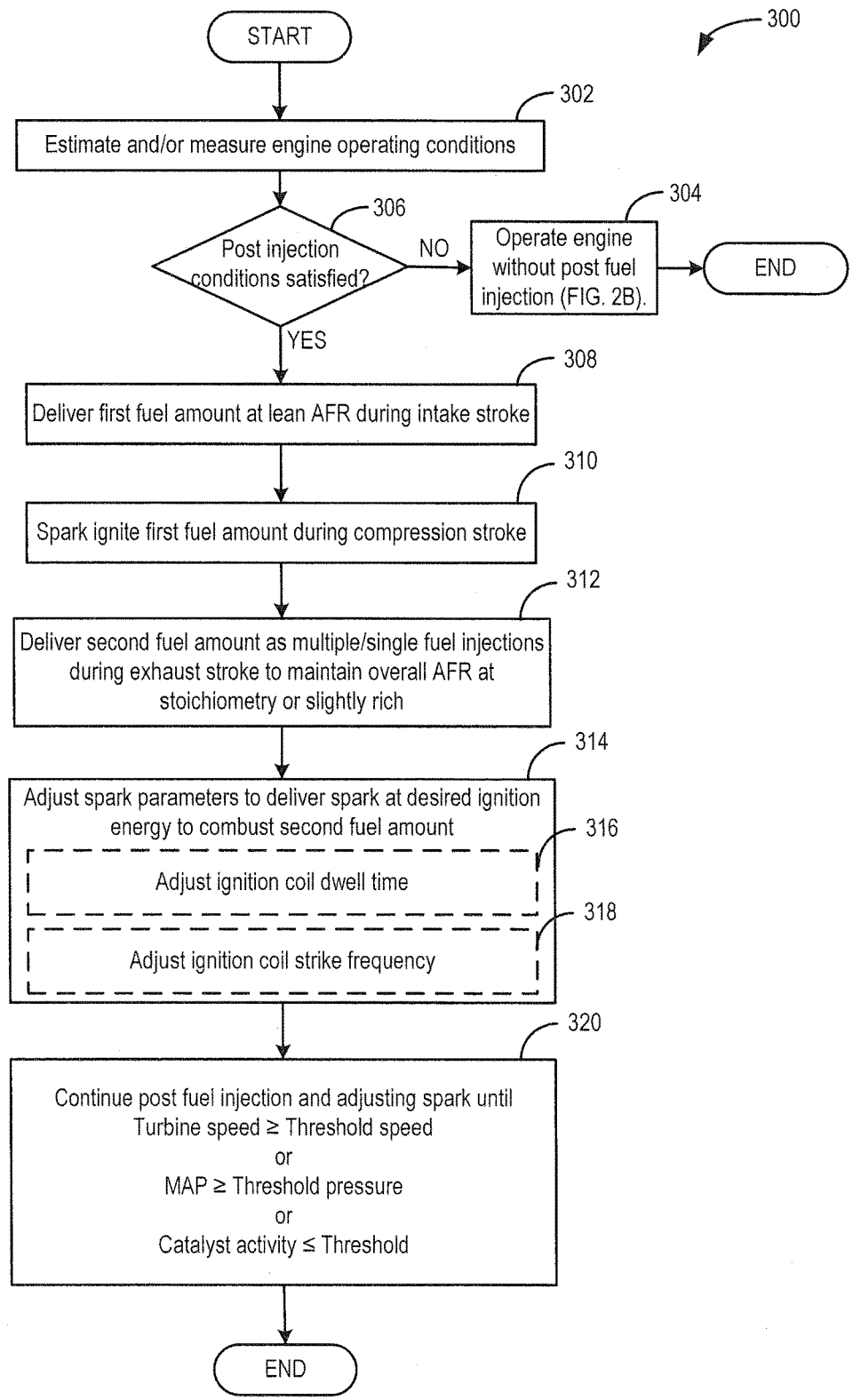
FIG. 3 shows a flowchart depicting an example method for adjusting spark ignition during second fuel injection.

Turning to FIG. 3, routine 300 shows an example method for adjusting spark ignition during post fuel injection engine operation. For example, spark energy, spark timing, and a number of spark outputs may be adjusted to provide spark for combustion of post fuel injection during the exhaust stroke such that post fuel combustion may be controlled and parasitic heat loss may be reduced. Post fuel injection may be performed as described at FIG. 2A. In one example, a controller, such as controller 12 shown in FIG. 1, may execute routine 300 based on instructions stored thereon.

At 302, engine operating conditions may be measured and/or estimated. Engine operating conditions may include but are not limited to engine speed and load, mass air flow, throttle position, boost pressure, manifold absolute pressure, manifold temperature, engine coolant temperature, barometric pressure, exhaust catalyst temperature, etc. Based on the determined engine operating conditions, at 306, the controller may determine if post fuel injection conditions are satisfied. In other words, the controller may determine if post fuel injection is required. For example, as discussed at FIG. 2A, post fuel injection may be performed if a torque demand is greater than threshold and/or if an exhaust catalyst temperature is less than operating threshold temperature. In one example, post fuel injection may be performed during cold start conditions to reduce turbo lag and/or to increase catalyst temperature to a threshold temperature for optimal catalyst performance. In another example, post fuel injection may be performed during acceleration from un-boosted steady-state cruise conditions and/or idle conditions to reduce turbo lag when torque demand is greater than a threshold.

If, at 306, post fuel injections are not satisfied, the routine may proceed to 304 to operate engine without post fuel injection as discussed at FIG. 2B. That is, the engine may operate without injecting a second amount of fuel during exhaust stroke of the cylinder combustion cycle. However, if at 306, post fuel injection conditions are satisfied, the routine continues on to 308.

At 308, a first amount of gaseous fuel may be delivered to the combustion chamber during an intake stroke of a cylinder combustion event, and at 310, the first fuel amount may be combusted during a compression stroke of a cylinder combustion event. The first amount may be based on a gaseous fuel amount producing a lean air-fuel ratio. Additionally, the first fuel amount may be based on the torque demand. In another example, the first fuel amount may be based on a gaseous fuel amount producing a stoichiometric air-fuel ratio. The combustion of the first fuel amount may be initiated by a spark having a first ignition energy. As such, the first ignition energy of spark may be adjusted to provide energy during the compression stroke to initiate combustion. For example, the first ignition energy may be adjusted based on cylinder load conditions. As such, since the cylinder load conditions may be based on engine operating conditions, the first ignition energy may be adjusted based on engine speed and load conditions (e.g., such as torque demand). Further, the ignition energy required to break a spark plug gap may be a function of in-cylinder pressure. As such, in-cylinder pressure may be higher during the compression stroke near the top dead center (TDC) than during other times in the cylinder combustion cycle. Consequently, higher ignition energy may be required to initiate combustion of the first fuel amount during the compression stroke.

Additionally, a spark timing may be adjusted for fuel economy and torque. That is, the spark timing may be adjusted at minimum spark advance for best torque (MBT). In some examples, spark timing may be adjusted based on detonation limit.

Following combustion of the first fuel amount, at 312, post fuel injection may be performed during which, a second amount of gaseous fuel may be delivered during the exhaust stroke of the cylinder combustion event. In one example, the second fuel amount may be based on a fuel amount that completes burning excess oxygen resulting from igniting the first amount of fuel and results in one or more of a stoichiometric or slightly rich air-fuel ratio. In another example, the second fuel amount may be additionally or alternatively based on an increase in torque demand with the second amount of fuel increasing with increasing torque demand.

In one example, a single post fuel injection may be performed during each exhaust stroke, in between consecutive cylinder combustion events. In another example, more than one post fuel injection may be performed during each exhaust stroke, in between consecutive cylinder combustion events. The number of post fuel injections may be determined based on the second fuel injection amount (that is, total amount of fuel required for post injection). In one example, the second fuel amount may be based on turbine speed and the air-fuel ratio of the first fuel injection. As discussed above, the second fuel amount may be adjusted such that the overall air-fuel ratio may be maintained at stoichiometry or slightly rich.

Subsequently at 314, spark parameters may be adjusted to deliver spark at a desired ignition energy to combust the second fuel amount. For example, the second fuel amount may be combusted (e.g., burned) during the exhaust stroke by igniting the second fuel amount with a spark having a second ignition energy. As discussed above, the ignition energy may be based on cylinder load conditions. As such, the second ignition energy may be based on torque demand and may increase with increasing torque demand. For example, based on torque demand, the second fuel amount (that is, the post fuel injection amount), may be adjusted. In order to provide required spark for combustion, the second ignition energy may be adjusted based on the second fuel injection amount. In one example, the second ignition energy may be based on inferred cylinder pressure, which may be a function of air charge, air charge temperature, spark timing and valve timing events. Since in-cylinder pressures may be lower during the exhaust stroke than during the compression stroke, the second ignition energy for post fuel combustion occurring during the exhaust stroke may be lower than the first ignition energy for the first fuel combustion. Further, the second ignition energy for the combustion of the second fuel amount may be based on a spark timing of the spark for second fuel combustion. In other words, the second ignition energy may be based on when during the exhaust stroke the second amount of fuel is ignited. For example, the second ignition energy may be higher when the second fuel injection is ignited earlier during the exhaust stroke than when the second fuel injection is ignited during later stages of the exhaust stroke. In this way, torque losses due to post injection ignition may be reduced.

In some examples, spark timing may be adjusted to coincide with the end of fuel injection for the second fuel injection. In this case, ignition energy may be based on timing of the delivery of the second fuel injection. For example, the second ignition energy may be higher when the second fuel injection is delivered (e.g., injected) earlier during the exhaust stroke than when the second fuel injection is delivered later during the exhaust stroke. Further, the timing of the second fuel injection and the spark timing of the second fuel injection may be based on torque demand and potential loss of torque. For example, in order to reduce negative torque or loss of torque such as during initial stages of a tip-in event (when torque demand is greater than the threshold torque demand), the second fuel injection may be performed later during the exhaust stroke and spark may be provided after the second fuel injection (or spark may coincide with the end of the second fuel injection). Consequently, lower ignition energy may be required to combust the second fuel injection during later phase of the exhaust stroke. Similarly, when the second fuel injection and ignition is performed during an early phase of the exhaust stroke, higher ignition energy may be required.

In one example, the second ignition energy may be based on the first ignition energy of the same cylinder combustion event. In another example, the second ignition energy may be based on the first ignition energy of a previous cylinder combustion event. For example, the second ignition energy may be lower than the first ignition energy by a fixed percentage. In one example, second ignition energy may be 10% lower than the first ignition energy. In another example, the second ignition energy may be 30% lower than the first ignition energy. The fixed percentage may be based on average peak cylinder pressures for the engine. In some examples, the fixed percentage may be based on time required to recharge for strike (that is, ignition of second fuel injection) during the exhaust stroke. In this way, in one example, the second ignition energy of the spark for combusting the second amount of fuel (during the exhaust stroke) may be based on engine operating conditions including engine speed and load, spark timing, and the second fuel amount. In another example, the second ignition energy may be based on the first ignition energy of the spark for combusting the first amount of fuel (during the compression stroke). Specifically, the second ignition energy may be a fixed percentage lower than the first ignition energy.

As shown at 316, ignition energy for the combustion of the second fuel amount may be adjusted by adjusting an ignition coil dwell time. In one example, lower ignition energy may be utilized compared to ignition energy utilized during the compression stroke. Ignition energy may be decreased by decreasing the ignition coil dwell time. That is, a voltage applied to an ignition coil may be maintained at a substantially shorter duration during post fuel injection. This decreases the primary current that the coil charges to, thereby decreasing its inductive energy.

In one example, during multiple post fuel injections, each post fuel injection may be ignited by a lower ignition energy spark. For example, during a single cylinder combustion cycle comprising multiple fuel injections, a first post fuel injection may be ignited by a first post fuel ignition energy, and a second subsequent post fuel injection may be ignited by a second post fuel ignition energy. The second post fuel ignition energy may be lower than the first post fuel ignition energy.

In some examples, when more than one post fuel injection may be required per cylinder combustion cycle, spark may be provided during each post fuel injection for post fuel combustion. Due to lower ignition energy requirements for post fuel ignition, shorter dwell times may be utilized, which allows sufficient time for re-dwelling and discharging at lower ignition energy for consecutive post fuel injections.

Further, as shown at 318, adjusting ignition energy may additionally or alternatively include adjusting a number of strikes of the ignition coil for each post fuel combustion event. For example, the number of strikes of the ignition coil may be decreased to decrease ignition energy. That is, lower strike frequency may be used to decrease a number of sparks output by the ignition coil per post fuel combustion event. By utilizing shorter dwell times and/or lower strike frequency during post fuel injection, electrical energy waste and parasitic loses may be reduced.

In one example embodiment, ignition systems may comprise dual coil ignition circuits where multiple coils per cylinder may be controlled to provide spark for the duration of the post fuel injection. For example, a long duration spark may be delivered during the second fuel injection such that the second fuel injection amount stays ignited. Providing long duration spark may be performed with re-strike or a system having two coils with output to the same plug. One coil may have short duration with a high peak secondary output, and another coil may have a long duration with lower peak secondary output. During the second fuel injection, the longer duration coil may be discharged. In other words, the short duration high secondary output and the long duration lower secondary outputs may be utilized to strategically deliver spark for combustion of the first fuel amount and the second fuel amount.

Next, at 320, the controller may continue to perform post fuel injection and adjust spark as discussed above until a turbine speed increases above a threshold speed. In one example, post fuel injection and spark adjustment may be performed until a manifold pressure increases above a threshold manifold pressure. In another example, post fuel injection and spark adjustment may be stopped when a catalytic activity of an exhaust catalyst decreases below a threshold activity.

In this way, post fuel injection may be adjusted by adjusting the injection amount, injection frequency, and ignition energy to combust the post injection fuel amount and provide exhaust heat energy to reduce turbo lag and/or decrease duration for the catalyst to light-off. By combusting the post fuel injection by spark ignition, dependence on combustion chamber heat for combustion, which may be lost to the cylinder, is reduced. Further, by utilizing shorter dwell times and/or by decreasing the coil strike frequency to decrease ignition energy, electrical energy losses may be reduced.

In one example, the method of FIG. 3 provides for an engine method comprising injecting liquefied petroleum gas (LPG) into a cylinder during an exhaust stroke, in between consecutive cylinder combustion events; and burning the injected LPG by striking an ignition coil multiple times during the exhaust stroke, each strike of a lower ignition energy. In one example, an amount of LPG may be injected through one injection, the amount based on one or more of a torque demand or an exhaust catalyst temperature. In another example, the amount of LPG may be injected through multiple injections and striking the ignition coil one or more times for each of the multiple injections. The ignition energy of subsequent strikes may be decreased by decreasing ignition coil dwell time, decreasing a strike rate, and decreasing current level of an ignition coil.

The method further includes injecting LPG into the cylinder during the exhaust stroke when an exhaust catalyst temperature is below a threshold temperature and/or injecting LPG into the cylinder during the exhaust stroke when a turbine speed is a threshold amount below a threshold turbine speed, the threshold turbine speed based on a torque demand.

Injecting LPG during the exhaust stroke may be stopped when the catalyst temperature increases to or above the threshold temperature. In another example, injecting LPG during the exhaust stroke may be stopped when the turbine speed increases to or above the threshold turbine speed. In yet another example, injecting the LPG during the exhaust stroke may be stopped when a manifold pressure increases to or above a threshold manifold pressure, the threshold manifold pressure based on the torque demand. In still another example, injecting LPG during the exhaust stroke may be stopped when catalytic activity of an exhaust catalyst decreases below a threshold level.

Now turning to FIG. 4, map 400 depicts example fuel injection and post fuel injection timings that may be used to reduce turbo lag and/or to improve catalyst light-off. Turbo lag may be reduced by reducing time required to bring the turbine speed up to the desired speed and catalyst light-off may be improved by reducing time required to increase the exhaust catalyst temperature to the threshold temperature. Specifically, map 400 depicts intake valve timing at plot 402, exhaust valve timing at plot 404, piston position at plot 406, an example fuel injection profile used during fuel injection, and fuel injections in a single cylinder combustion event at plot 407 (including fuel injection bars 408, 410, and 412 relative to sparks indicated at 414, 416, and 418, respectively), and an example ignition energy profile at plot 420 for sparks 414, 416 and 418.

As discussed at FIG. 1, during engine operation, each cylinder within the engine typically undergoes a four stroke cycle: the cycle includes the intake stroke, compression stroke, power (or expansion) stroke, and exhaust stroke. During the intake stroke, generally, the exhaust valve closes (plot 404, dashed line) and the intake valve opens (plot 402, solid line). An air-fuel mixture is introduced into the cylinder via the intake manifold, and the cylinder piston moves to the bottom of the cylinder so as to increase the volume within the combustion chamber (plot 406). During the compression stroke, the intake valve and exhaust valve are closed. The piston (plot 406) moves toward the cylinder head so as to compress the air-fuel mixture within the cylinder.

During injection, a first fuel amount may be introduced into the combustion chamber during the intake stroke (shown at 408). The injected fuel may be ignited by a spark plug during compression stroke (spark shown at 414) resulting in combustion. During the expansion stroke, the expanding gases push the piston back to BDC. A crankshaft coupled to the piston converts piston movement into a rotational torque of the rotary shaft. Finally, during the exhaust stroke, the exhaust valve opens (plot 404) to release the combusted air-fuel mixture to the exhaust manifold and the piston returns to TDC.

During engine operation with post fuel injection, a second fuel amount (shown at 410) may be introduced into the combustion chamber during the exhaust stroke. As shown in FIG. 4, the amount of fuel injected during the first fuel injection may be greater than the amount of fuel injected during the second fuel injection (that is, during post fuel injection). Further, the amount of fuel injection during the second fuel injection, during the exhaust stroke, may be based on the turbine speed relative to a threshold turbine speed that may produce the requested torque. Additionally, the amount of fuel injection during the second fuel injection may be based on the air available from the first fuel injection to react with the second fuel injection, combust, and release heat.

In some examples, as depicted in FIG. 4, more than one post fuel injection may be performed (as depicted by the two post fuel injections shown at 410 and 412). In other words, the second fuel amount may be delivered in two aliquots, or two post fuel injections. The number of post fuel injections per cylinder cycle may be determined based on the determined second fuel injection amount. In one example, the number of post fuel injections per cylinder cycle may be based on engine speed since gas exchange interaction with in-cylinder motion may necessitate multiple post injections as flame moves away and into exhaust, and new oxygen becomes available via the intake. As discussed above, the second fuel injection amount may be based on torque demand and the amount of extra exhaust needed to increase turbine speed to a demanded level (e.g., a threshold level based on the torque demand). In one example, a first post fuel injection amount (shown at 410) may be greater than a second fuel injection amount (shown at 412). In another example, the amount of first and second fuel injections may be substantially equal. Further, an ignition energy (plot 420) required to combust the first fuel amount during the compression stroke may be greater than an ignition energy required to combust the second fuel amount during the exhaust stroke. As discussed at FIG. 3, the ignition energy required during respective compression and exhaust strokes may be determined as a function of in-cylinder pressure. As discussed above, in-cylinder pressures may be higher during the compression stroke than during the exhaust stroke. Therefore, a higher (e.g., larger amount of) ignition energy may be required to initiate combustion of first fuel amount during the compression stroke compared to the ignition energy required to initiate combustion of the second fuel amount during the exhaust stroke post fuel injection. Further, during multiple exhaust stroke post fuel injections, combustion of subsequent post fuel injections may be initiated utilizing lower ignition energy. As described above, the ignition energy for post fuel injections may be based on one or more of the post fuel injection amount (e.g., the amount of fuel injected), in-cylinder pressure, spark timing, fuel injection timing, ignition energy of the first fuel injection, and available dwell times. For example, the ignition energy of the spark (shown at 416) for combustion of the first post fuel injection amount may be higher than ignition energy of the spark (shown at 418) for the second post fuel injection amount. The spark timings may also be based on injector timing.

Further, a timing of the second fuel injection (that is, post fuel injection) may be adjusted based on torque demand and potential torque loss. For example, during initial stages of a tip-in event (such as from idle or steady-state un-boosted conditions), when increased torque demand is generated, the timing of delivery of the second fuel injection may be adjusted to a later phase of the exhaust stroke to reduce negative torque. Progressively, as more torque is generated, the timing of delivery of second fuel injection may be adjusted to an earlier phase of the exhaust stroke.

Spark timing for initiation of combustion of fuel injection and post fuel injection may be adjusted for efficient combustion of the fuel, torque generation, and reduction of torque loss. For example, spark timing for combustion of the first fuel amount may be adjusted at MBT. Alternatively, spark timing for the first fuel amount may be adjusted based on detonation limit. During post fuel injection, spark timing may be adjusted such that spark is delivered to coincide with the end of injection. In one example, spark timing may be retarded if heat is desired in the turbocharger or the exhaust after treatment system. In another example, spark may be provided during injection. For example, a spark may be provided after 30% of post fuel injection followed by a re-strike after end of injection.

In this way, timing of delivery of post fuel injection, and spark timing and energy for post fuel injection combustion may be adjusted, thereby providing additional exhaust energy which may be utilized at least partially to reduce turbo lag when a torque demand increase is greater than a threshold and/or to decrease the duration for catalyst to light-off when exhaust catalyst temperatures are below the threshold temperature.

Turning to FIG. 5, graph 500 shows example post fuel injection events that may be performed during acceleration from steady-state conditions and cold start conditions. Specifically, accelerator pedal position is shown at plot 502, torque demand is shown at plot 503, exhaust catalyst temperature is shown at plot 504 with a threshold operating temperature for the exhaust catalyst indicated at plot 506, a desired (e.g., threshold) MAP, based on torque demand, is shown at plot 508, an actual change in MAP during engine operation with post fuel injection is shown at plot 512, an actual change in MAP during engine operation without post fuel injection is shown at plot 510, an air-fuel ratio (AFR) during a first intake stroke fuel injection is shown at plot 516 with respect to stoichiometry (indicated at 514), an overall combustion AFR is shown at plot 518 with respect to stoichiometry (indicated at 520), NOx emissions as a measure of catalytic activity is shown at plot 522 with respect to a threshold emission level indicated at 524, and post fuel injection activity is shown at plot 526. In one example, NOx emissions may be estimated based on a NOx sensor located downstream of the exhaust catalyst. In another example, when NOX sensor is not present, emissions through the catalyst may be monitored by comparing switching ratios between a pre-catalyst UEGO (located upstream of the catalyst) and a post-catalyst HEGO (located downstream of the catalyst). The graph 500 is plotted with time along the x-axis.

Prior to t1, the vehicle in which the engine is installed may be accelerating from cold-start conditions. Accordingly, an increase in acceleration is shown as an increase in pedal position (plot 502). Due to cold-start conditions, the catalyst may be operating at a temperature lower than the threshold temperature (plot 504). Further, due to acceleration from cold start conditions, the increase in torque demand may be above a threshold torque demand increase (plot 503, threshold not indicated). The threshold torque demand increase may be based on an increase in required boost that results in turbo lag. Consequently, in order to decrease the time taken to meet the torque demand and increase the catalyst temperature, post fuel injection may be performed (plot 526). In other words, post fuel injection may be performed to more quickly increase the turbine speed, and thereby reduce turbo lag. Exhaust energy from post fuel injection may be additionally utilized to decrease the time taken for the exhaust catalyst to reach its threshold operating temperature. During engine operation with post fuel injection, a first fuel injection may be performed resulting in lean air-fuel ratio (plot 516) and a second fuel injection may be performed (that is, post fuel injection) with second fuel amount adjusted such that overall AFR is at stoichiometry or slightly rich (plot 518). The excess oxygen due to lean operation during the first fuel injection may be utilized to combust post fuel injections. Further, MAP and NOx emissions may be monitored during post fuel injections. Prior to t1, actual MAP (plot 512) may be lower than a desired MAP (plot 508) and NOx emissions may be lower than the threshold emission level 524 (plot 522). Post fuel injection may be performed until MAP reaches a threshold pressure, the threshold pressure based on a boost level producing the torque demand. In some examples, turbine speed may be monitored (not shown) additionally or alternatively relative to a threshold turbine speed, the threshold turbine speed based on the turbine speed producing the boost for the torque demand. At t1, and between t1 and t2, post fuel injection may continue to be delivered so that post fuel combustion energy may be utilized to bring the actual MAP to the threshold MAP (e.g., desired MAP). Additionally, exhaust energy from post fuel injection may be utilized to increase catalyst temperature to a threshold temperature. In some examples, un-combusted fuel from post fuel injection may interact with oxygen in the exhaust catalyst resulting in combustion at the exhaust catalyst, which may further contribute towards improving catalyst light-off.

At t2, actual MAP may reach the threshold MAP and consequently, post fuel injection may be terminated (e.g., stopped), and engine operation may continue with fuel injection without post fuel injection. If post fuel injection is not utilized when the increase in torque demand is greater than the threshold, the time taken for the turbine to reach a desired speed may be longer, and consequently time taken for MAP to reach the desired MAP may be longer (see plot 510, where time taken for actual MAP extends beyond t2 for an example when post fuel injection is not utilized). Thus, by performing post-fuel injections, the time taken to deliver operator demanded torque may be reduced. In other words, by performing post fuel injections turbo lag may be reduced.

Between t2 and t3, the engine may operate in steady-state conditions during which the increase in torque demand may be less than the threshold. Further, exhaust catalyst temperature may be above the threshold temperature 506. Consequently, post fuel injection may not be performed. Instead, fuel injection may occur during the compression stroke and not during the exhaust stroke. Total AFR may be maintained close to stoichiometry. In other examples, AFR may be adjusted above or below stoichiometry based on engine operating conditions. Between t3 and t4, acceleration may decrease (for example, due to tip out) and engine load may decrease. As a result, torque demand may be lower than a threshold and the engine may operate at un-boosted conditions. Further, catalyst temperature may be above the threshold operating temperature 506. Consequently, post fuel injection may not be performed.

Further, between t4 and t5, the engine may operate in un-boosted steady state conditions. As such, torque demand may not increase, and the catalyst may be operating at or above the threshold temperature 506. Consequently, the engine may operate without post fuel injection.

Next, at t5, due to a change in vehicle operation, such as operator requested acceleration, there may be an increase in torque demand greater than a threshold. Consequently, boost may be required to meet the torque demand. In order to reduce the time required to spin the turbine to a desired speed and reduce turbo lag, post fuel injection may be performed (plot 526). As discussed herein, during engine operation with post fuel injection, a first fuel amount resulting in a lean air-fuel ratio (e.g., an air-fuel ratio leaner than stoichiometry) may be delivered during the intake stroke and the first fuel amount may be combusted during the compression stroke. Subsequently, post fuel injection may be performed during which a second fuel amount may be delivered and combusted during the exhaust stroke. The second fuel amount may be adjusted such that the total AFR is at stoichiometry or slightly rich. The exhaust energy from the post fuel combustion may be partially utilized to spin the turbine and bring the turbine to the desired speed at a faster rate. At t6, the actual MAP may reach the desired MAP, and NOx emission may increase above a threshold. For example, catalytic activity may decrease as a result of increased oxidation of the catalyst causing decreased reduction of NOx in the exhaust. Increased oxidation of the exhaust catalyst may occur due to the lean air-fuel ratio during combustion of the first fuel amount when post post-fuel injection is performed. Upon reaching the desired MAP, post fuel injection may be terminated.

It should be noted that when the engine is operated with post fuel injection, the time taken to reach the desired MAP (plot 512) is less than the time taken than if the engine were operated without post fuel injection (plot 510). Between t6 and t7, and beyond t7, torque demand increase may not be greater than threshold and exhaust catalyst may be at or above the operating temperature. Therefore, post fuel injection may not be performed.

In this way, post fuel injection may be performed according to an engine method comprising injecting and (subsequently) igniting a first amount of liquefied petroleum gas (LPG) with a first ignition energy during a compression stroke of a cylinder combustion event when an increase in torque demand is less than a threshold; and during an increase in torque demand greater than the threshold, injecting and (subsequently) igniting a second amount of LPG with a second ignition energy during an exhaust stroke of the cylinder combustion event. The second amount of LPG is smaller than the first amount of LPG and the second ignition energy is smaller than the first ignition energy. During the increase in torque demand greater than the threshold, the first amount is based on a LPG amount resulting in a lean air-fuel ratio and the second amount is based on a LPG amount that completes burning excess oxygen resulting from igniting the first amount of LPG and results in one or more of a stoichiometric or slightly rich air-fuel ratio. The second amount is further based on the increase in torque demand, the second amount increasing with increasing torque demand. The method may further include injecting and subsequently igniting the second amount of LPG during the exhaust stroke when an exhaust catalyst temperature is below a threshold temperature.

In another example, post fuel injection may be performed according on an engine method, comprising combusting a first amount of gaseous fuel during a compression stroke of a cylinder combustion event using a first ignition energy; and combusting a second amount of gaseous fuel during an exhaust stroke of the cylinder combustion event using a second ignition energy, the second ignition energy lower than the first ignition energy. The gaseous fuel is stored in a liquid fuel tank as liquefied petroleum gas (LPG). The first amount is based on a fuel amount resulting in a lean air-fuel ratio and the second amount is based on a turbine speed relative to a threshold turbine speed and the lean air-fuel ratio, the threshold turbine speed based on the torque demand increase. When the second amount of fuel is combusted during a cold start, the second amount is based on a temperature of a catalyst relative to a threshold temperature during the cold start. The method may further include combusting the second amount in response to a torque demand increase greater than a threshold.

Further, the second ignition energy is based on one or more of spark timing for the second amount (e.g., an ignition timing for the second amount), the second amount, and the torque demand increase and the second ignition energy increases with increasing torque demand increase. Additionally, one or more ignition parameters including ignition coil dwell timing, current level, and strike rate, is adjusted to obtain the second ignition energy.

In still another example, post fuel injection may be performed based on an engine method comprising during a first condition, igniting a first amount of liquefied petroleum gas (LPG) during a compression stroke of a cylinder combustion event and igniting a second amount of fuel during an exhaust stroke of the cylinder combustion event; and during a second condition wherein a torque demand increase is below a threshold, igniting a third amount of fuel during a compression stroke of a cylinder combustion event and not injecting any fuel during an exhaust stroke of the cylinder combustion event, the first amount being greater than the second amount. Further, the first condition may include one or more of the torque demand increase being greater than the threshold and an exhaust catalyst temperature being lower than a threshold temperature. The method may further comprise during igniting the second amount of fuel adjusting one or more spark parameters based on a desired ignition energy, the desired ignition energy based on the torque demand increase.

In this way, performing post fuel injection during transient conditions may reduce the duration to accelerate the turbocharger to a desired speed and provide desired boost. Additionally, performing post fuel injection during cold start conditions may reduce the duration for the exhaust catalyst to warm up to a threshold operating temperature. By spark-igniting the fuel during post fuel injection, loss of heat to the combustion chamber may be reduced. Further, by utilizing fuel such as LPG, which is injected in a gaseous form, formation of soot and particulate matter may be reduced. In this way, by injecting and combusting a second amount of fuel during an the exhaust stroke of a cylinder combustion event responsive to turbo lag and/or exhaust catalyst temperature, a technical effect is achieved, thereby reducing turbo lag and improving catalyst light-off.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
boosting intake air to an engine with a turbocharger; and during an increase in torque demand greater than a threshold,
spark igniting a first amount of gaseous fuel during a compression stroke of a cylinder combustion event; and
spark igniting a second amount of the gaseous fuel during an exhaust stroke of the cylinder combustion event, wherein the gaseous fuel is direct injected into a combustion chamber of the engine.

2. The method of claim 1, wherein exhaust gas is recirculated from an exhaust to an intake of the engine via an exhaust gas recirculation (EGR) system.

3. The method of claim 2, wherein the EGR system is coupled between an intake manifold and an exhaust manifold of the engine.

4. The method of claim 1, wherein the first amount is from a first injection and the second amount is from a second injection, the first injection separate from the second injection.

5. The method of claim 4, wherein the second amount is smaller than the first amount, and wherein the threshold is non-zero and increases with increasing engine speed at which the torque demand is generated.

6. The method of claim 4, wherein the first amount is based on a gaseous fuel amount producing a lean air-fuel ratio and wherein the second amount is based on the lean air-fuel ratio and another operating parameter.

7. The method of claim 1, further comprising spark igniting the second amount at a lower ignition energy than the first amount.

8. The method of claim 7, further comprising adjusting the ignition energy of the second amount by adjusting one or more of a dwell time, a current, a strike rate, and timing of a spark plug.

9. The method of claim 1, further comprising continuing spark igniting the first amount and the second amount for a number of combustion events, the number of combustion events based on one or more of a turbine speed relative to a threshold turbine speed and a manifold pressure relative to a threshold manifold pressure, the threshold turbine speed and the threshold manifold pressure based on the increase in the torque demand.

10. The method of claim 9, further comprising stopping injecting and spark igniting the second amount of gaseous fuel when the turbine speed increases above the threshold turbine speed or when the manifold pressure increases above the threshold manifold pressure or when catalytic activity of an exhaust catalyst decreases below a threshold level.

11. The method of claim 1, wherein the increase in torque demand is indicated by an increase in pedal position, and wherein the threshold is based on an increase in required boost.

12. A method for a turbocharged engine, comprising:
boosting intake air to the engine with a turbocharger;
direct injecting into a combustion chamber of the engine and igniting a first amount of liquefied petroleum gas (LPG) with a first ignition energy during a compression stroke of a cylinder combustion event when an increase in torque demand is less than a threshold; and during an increase in torque demand greater than the threshold, injecting and igniting a second amount of fuel with a second ignition energy during an exhaust stroke of the cylinder combustion event.

13. The method of claim 12, further comprising continuing spark igniting the first amount and the second amount for a number of combustion events, the number of combustion events selected based on one or more of a turbine speed relative to a threshold turbine speed and a manifold pressure relative to a threshold manifold pressure, the threshold turbine speed and the threshold manifold pressure based on the increase in the torque demand.

14. The method of claim 13, wherein the fuel is LPG, and wherein the second amount of LPG is smaller than the first amount of LPG and wherein the second ignition energy is smaller than the first ignition energy.

15. The method of claim 14, wherein during the increase in torque demand greater than the threshold, the first amount is based on a LPG amount resulting in a lean air-fuel ratio.

16. The method of claim 15, wherein the second amount is based on a LPG amount that completes burning excess oxygen resulting from igniting the first amount of LPG and results in one or more of a stoichiometric or slightly rich air-fuel ratio.

17. A method for an engine, comprising:
boosting intake air to the engine with a turbocharger;
during a first condition, igniting a first amount of liquefied petroleum gas (LPG) during a compression stroke of a cylinder combustion event and igniting a second amount of fuel during an exhaust stroke of the cylinder combustion event; and
during a second condition wherein a torque demand increase is below a threshold, igniting a third amount of fuel during a compression stroke of a cylinder combustion event and not injecting any LPG during an exhaust stroke of the cylinder combustion event.

18. The method of claim 17, wherein the first amount is greater than the second amount, and wherein the first condition includes one or more of the torque demand increase being greater than the threshold and an exhaust catalyst temperature being lower than a threshold temperature.

19. The method of claim 17, further comprising igniting the second amount of fuel during a positive valve overlap condition.

20. The method of claim 17, further comprising during igniting the second amount of fuel adjusting one or more spark parameters based on a desired ignition energy, the desired ignition energy based on the torque demand increase.

* * * * *